United States Patent Office 3,546,762
Patented Dec. 15, 1970

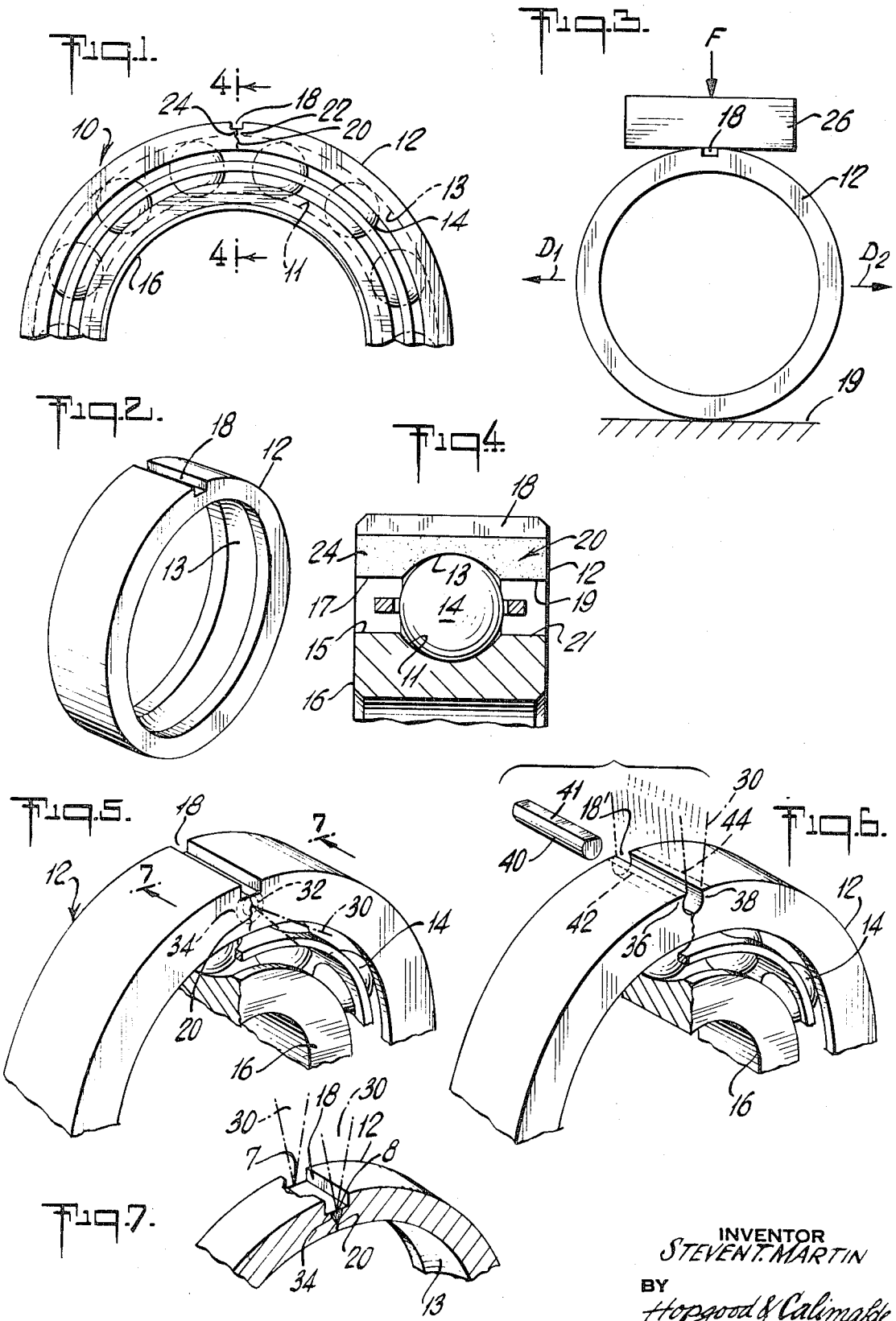

3,546,762
**METHOD OF MAKING AN
ANTIFRICTION BEARING**
Steven T. Martin, West Hartford, Conn., assignor to
Textron Inc., Providence, R.I., a corporation of Delaware
Filed July 1, 1968, Ser. No. 741,731
Int. Cl. B23p 11/00; B21b 1/12
U.S. Cl. 29—148.4          16 Claims

ABSTRACT OF THE DISCLOSURE

A method for fabricating a bearing structure of the split-ring type is described. The bearing outer race ring, after formation and hardening, is split to define a seam, and the fractured ends are separated to preassemble the bearing with antifriction elements and an inner race ring. The fractured ends are then joined by fusion-welding at the seam with an electron beam. In one method, the beam is directed axially at a radially outer portion of the seam, and in another method the beam is directed radially inwardly at the periphery, to effectively fuse the outer peripheral portions of the fractured ends to one another. In both methods, the fusion-welding is sufficiently localized to leave intact the original finish and heat treatment of the fractured ring.

---

This invention relates to a method for making bearing structures. More specifically, it relates to a method of making so-called divisible or split-bearing structures wherein the outer race ring is divisible or split during assembly for inserting more than the usual complement of antifriction elements between the inner and outer race rings of the bearing.

Patents have been granted which describe bearing structures of the divisible types; see, for instance, the patents to Pierce 1,498,748 and 1,675,728, and Stearns 2,648,578 and 2,657,105.

In a bearing structure in which the outer race ring has been fractured to permit insertion of the antifraction elements, care must be taken to maintain the broken ends in intimate interlocking mating relationship under all conditions in which the bearing may be used. In this respect, reliance upon the natural resiliency of the fractured ring is inadequate, in that support of rolling elements under load is not uniform. It has been suggested that a locking member be used on the outer race ring to maintain interlocking of the fractured ends. However, this member involves the addition of a part, the machining of a recess to receive the member in the ring, and adds undesirable weight to the bearing.

It is therefore an object of this invention to provide an improved method for assembling a divisible bearing structure.

It is a further object of this invention to provide a divisible bearing structure capable of absorbing radial and axial loads without separation of the bearing structure.

It is still further an object of this invention to provide a method for making a light-weight bearing structure of the divisible type in an economical manner.

A specific object is to produce an improved ball bearing with a relatively full complement of balls, and without imposing limitations as to race-groove depth and effective continuity of raceway side-shoulder support.

Another specific object is to provide an improved bearing construction and method of the character indicated, wherein the bearing itself imposes no requirement of close fit to a shaft or housing, and wherein the ability to sustain thrust loads is not impaired by side-wall discontinuities such as filling slots.

These and other objects are accomplished by my invention which will be described in conjuction with the accompanying drawings. In said drawings:

FIG. 1 is a fragmentary view in side elevation of a preassembled bearing structure with a split outer race ring, prior to welding in accordance with my invention;

FIG. 2 is a perspective view of a hardened and finished outer race ring prior to fracture;

FIG. 3 is a simplified side view, illustrating the step of fracturing the outer race ring;

FIG. 4 is an enlarged cross-sectional view of the bearing taken along the line 4—4 of FIG .1;

FIG. 5 is a fragmentary view in perspective to show one method of fusion-welding the radially outer portion of the fracture in accordance with my invention;

FIG. 6 is a view similar to FIG. 5 to show an alternate method for fusion-welding the fractured ring ends to one another; and FIG. 7 is an enlarged perspective fragmentary view of a section of the outer ring of FIG. 2, taken along a central radial plane of the raceway.

Briefly, my invention contemplates the fracturing of a hardened outer race ring of a bearing, followed by assembly with the inner race ring and the antifriction elements (including a retainer, if needed), and subsequent fusion-joining the fractured ends of the outer race ring, with insignificant impairment of prior heat treatment or finish of the race surface.

In FIG. 1, a preassembled bearing structure 10 is partially shown with an inner hardened race ring 16, a hardened split outer race ring 12 and antifriction elements 14, such as balls, inserted between the rings. The inner and outer race rings are provided respectively with concave races 11 and 13 for the elements 14. The outer race ring 12 is provided at its outer surface with a groove 18 which runs lengthwise of the ring axis and preferably parallel thereto. The outer ring is split along the seam 20 which commences at the bottom of the groove and terminates at the inner surface of the ring. The seam 20 is formed by the adjacent mating fractured ends 22 and 24 and extends axially throughout the ring to permit enlargement of the ring for the insertion of a complement of balls between the rings.

The outer race ring 12 as shown in FIG. 2 is formed of tubular stock, bar stock or a forging, in the usual manner. The ring is machined to its final dimensions both inside and outside and provided with a raceway 13. The narrow groove 18 is formed as part of the machining. The groove may be U-shaped or V-shaped but is shown square, and extends longitudinally of the ring. The purpose of this groove on the outside of the ring 12 is to provide a locally weakened section for fracture along a preselected generally radial seam.

The groove 18 may be cut before or after hardening, but I prefer the latter alternative. Hardening may be accomplished by the customary heat-treating methods. The ultimate degree of hardness is immaterial except that it should permit the subsequent fracturing without permanent deformation of the ring.

The ring may be case-hardened by hardening the race surface to a preselected depth with the majority of the ring material retained at a lower hardness level but with high strength. The case-hardened ring must be capable of being fractured without permanent deformation.

After the ring is hardened, its raceway 13 is ground and finished to the desired ultimate finish. Ring 12 is then broken along a radial seam or plane of weakness as determined by the groove 18. With the ring 12 supported on a suitable table surface 9, a radially inward breaking force or squeeze F is applied as shown in FIG. 3 by, for instance, a loading member 26 positioned directly over the groove 18. The force F is carefully controlled to avoid injury of the broken surfaces and to avoid any permanent deformation. Under the force F, the vertical compression of ring 12 produces horizontally outward displacements $D_1$–$D_2$ at ring portions intermediate the squeezed regions, resulting in fracture due to localized severe tension and bending stress in the ring at groove 18. Upon release of force F, the facing surfaces of the fractured ring ends 22 and 24 assume a mated relation to form a near-perfect cylinder having a smooth raceway 13 for the bearing antifriction elements.

After fracture, the outer race ring 12 is ready to be preassembled with the other parts of the bearing parts into a bearing unit. Insertion of the ball elements 14 may be done for instance as shown in the patent to Gurney 845,632. Although in this patent a full complement of balls is shown inserted between the race rings, a lesser number of balls with a suitable retainer or cage (suggested at 21) may be used. The number of antifriction elements is dependent upon the load requirements for the bearing.

The cross-sectional view of FIG. 4 illustrates the relation of the preassembled parts, taken in the general plane of fracture, to reveal the face of the fractured end 24. The antifriction elements 14 are seen to be received in deep races 11–13 defined between substantial shoulders 17–19 and 15–21 on the respective rings 12–16.

Because the bearing structure of FIG. 1 may not be adequately held together by the inherent resilience of the ring 12, an additional step is performed to join the ends 22 and 24 to one another; preferably, however, and in order to assure perfect fit and continuity of the raceway, the ring 12 is held in a suitable circumferentially confining clamp, jig, or other fixture (not shown) during the joining step. This joining step is preferably carried out by controllably fusing portions of these ends by a very quick and therefore very localized heating process.

More specifically, in the method of FIG. 5, the structure of FIG. 1 is fusion-joined by an energized beam of charged particles 30, such as an electron beam, directed and focused at an outer portion of the seam 20, as at a radially outwardly localized area of an axial end face of ring 12, indicated generally by the dotted line 34. The energized beam is directed substantially parallel to the bearing axis, and its power and power density so controlled that the axial zone, i.e., axially inwardly of the localized surface area 34, is quickly melted along the fractured seam 20. This zone may be, as shown, confined to the material immediately adjacent the bottom of the groove and the seam 20. Upon removal of the beam 30, the fused material coalesces to form a welded junction of the fractured ends 22–24. The fusion is controlled to occur so quickly that neither the surface-hardened condition nor the ground finish of the nearby raceway 13 is adversely affected or deteriorated; moreover, the weld is achieved without affecting any of the other preassembled bearing parts.

Alternatively, the fusion-joining may be done by directing the beam 30 first at one axial end face of the seam to fuse a radially outwardly localized area to a preselected axial depth. The depth may be limited to a surface tack-type weld or extend axially along the seam, depending upon the desired amount of metal to be fused by the beam. Such depth control may be simply obtained by varying the focus and power of the beam. After fusion at one axial end, the opposite axial end of the seam may be so fused. An advantage of this welding method resides in the accompanying reduction of the radially extending heat-affected zone, thereby avoiding a change in the finish and hardness of the nearby raceway.

Furthermore, the beam 30 may be directed radially inwardly at the seam 20 to fuse the outer periphery thereof. This may be done during a traverse of the beam along the axial length of the seam, or with a stitching-type beam with overlapping or spaced stitches. The stitched weld may simply be carried out by pulsing the beam. Pulsing of the beam provides a convenient method for controlling the fusion depth and the heat-affected zone in the ring. FIG. 7 shows the orientation of the ring 12 relative to the beam 30 and the stitched welds 7 and 8.

As shown in FIG. 7, the fusion zone 34 terminates radially inwardly a significant distance from the hardened raceway 13. This permits retention of the raceway hardness and reduces distortions of the seam in the raceway.

An important advantage of the fusion-welding step as described is its ability to control the circumferential shrinkage of the outer race ring. Too much shrinkage, produced by an excessive amount of fused metal, will create excessive stresses in the ring, whereas the correct amount will advantageously compress the fractured ends 22–24 together to assure the desired smooth raceway 13. The beam focus can be accurately controlled to provide the desired size of the melted zone. For instance, a beam used to melt zone 34 may be 0.030 inch thick and can easily be adjusted to melt a smaller zone 32 with a beam size of 0.010 inch. With such latter sized beam the amount of fused metal and heat-affected zone can be significantly reduced.

With the beam oriented as shown in FIG. 5, i.e., parallel to the bearing axis, inadvertent beam damage to other bearing parts may be avoided. However, the situation may arise where the amount of fused metal must be reduced to a minimum or where the heat from the beam-melted zone is to be kept as distant from the hardened raceway 13 as possible. FIG. 6 shows an alternate method for fusion-joining the fractured ends 22–24.

In FIG. 6 the outer race ring is again provided with a weakening groove. However, the groove 18' in this case is preferably formed during the formation of the ring by passing a drill adjacent the outer periphery of the ring and parallel to the ring axis with the drill partially breaking through the outer surface. The groove thus formed localizes ring weakness, for fracturing purposes; it is also characterized by opposed projecting outer edges 36 and 38 facing one another across the groove. The ring is hardened, finished and fractured as heretofore described.

The facing edges 36–38 are formed to allow the severed peripheral portions of the ring 12 to be effectively connected to one another. Since the edges are separated from one another by a gap, a metallic insert 40 is formed to fit within the groove 18. The insert is generally cylindrically shaped and is provided with a flat 41, to prevent protrusion of the insert outside the periphery of the ring. The insert has a diameter which is smaller than the diameter of the groove but greater than the gap separating the edges 36–38.

The insert diameter is selected to provide a convenient method for controlling the effect which the circumferential shrinkage force, due to fusion-welding, has on the seam 20. By suitably controlling the difference in diameter between the insert and the groove to be less than the circumferential shrinkage, the insert is made to absorb a portion of the force, thereby assuring firm mating of the fractured ends without distortions appearing at the seam in the raceway. This control may also be obtained by applying a longitudinal taper to the insert. The tapered insert then has the shape of a truncated cone.

By suitable fixturing, the insert 40 is held within the groove in abutment with the radially inward facing sides of the edges. A beam of charged particles is then directly radially inwardly generally at the insert and sufficiently defocused to melt the edges 36–38 along the zone 42–44, as well as to melt portions of the insert.

Upon removal of the beam, the melted material solidifies and the fractured ends 22–24 are effectively connected to one another. The melted zone is now considerably further from the hardened raceway 13 so that very little heat will reach this part of the ring. The smaller diameter of the insert will not impede the closing of the seam 20. If desired, one may, by carefully machining the diameter of the insert, prevent excessive stresses within the ring by providing a close fit of the insert in the groove.

Other welding methods may be employed to interconnect the outer edges 42–44 to the insert. For instance, a resistance welding operation may be conveniently carried out since the direction of current flow may be carefully controlled. One electrode may be coupled to the insert and the other to both outer edges.

It will be seen that I have described an improved high-complement antifriction construction having inherent ability to retain its dimensions under extended high load use. The invention achieves desirable results of accurately maintaining, in close, permanent, mated relation, the severed adjacent parts of a heat-treated, finish ground raceway that has been locally severed. The welding by which this relation is maintained is localized at a radius sufficiently remote from the race surface to have no deleterious effect on the prior race surface heat treatment, and permanent retention of the reunited ring is assured. The method of the invention makes possible the manufacture of ball bearings of high load capacity, particularly for high thrust-load applications, because a high complement of balls may be accommodated in races having deep race shoulders, uninterrupted by filling slots, and a united continuous outer-ring hoop permanently retains and supports the fracture of the outer race.

What is claimed is:

1. A method for constructing a bearing comprising, forming a hardened outer race ring having a finished internal annular raceway with a longitudinal groove located across the width of the ring at the outer surface thereof, fracturing the outer ring substantially along a radially extending seam terminating in the groove to provide mating fractured ends of the outer ring, filling the bearing by inserting between the substantially concentrically mounted rings and an expanded outer ring a plurality of antifriction elements, and fusion-welding a radially outer localized portion of the fractured ends when in abutting relation, whereby the split ring of the filled bearing may be united without deleterious effect on the hardened and finished raceway, and uninterrupted raceway support is provided under load.

2. The method of claim 1, in which the fracturing step comprises application of an inward squeezing force to the ring along a diametral plane which includes said groove.

3. The method as recited in claim 1, wherein the fusion-welding further comprises directing an energized beam generally at the seam in the groove to fuse radially outer adjacent fractured end portions to a preselected radial depth of the seam.

4. The method as recited in claim 3, wherein said fusion-welding step further comprises directing the energized beam along an axial direction at one axial end of the radially outer portion of the seam to fusion-weld the seam to a preselected axial and radial depth.

5. The method as recited in claim 4, wherein said fusion-welding step further comprises directing the energized beam along an axial direction at the other axial end of the radially outer portion of the seam to fusion-weld the seam to a preselected axial and radial depth.

6. The method as recited in claim 4, wherein said fusion-welding step further comprises fusion-welding said radially outer portion of the seam with a beam of charged particles, and adjusting the focus of the beam of charged particles to restrict the radially extending heat-affected zone within the vicinity of the radially outer seam portion and remote from the inner race surface of the outer ring.

7. The method as recited in claim 1, wherein said fusion-welding step further comprises directing a beam of charged particles radially inwardly at the seam in the groove, and controlling the power, focus and intensity of the beam to stitch-weld radially outer portions of the fractured ends to one another.

8. The method of claim 1, in which circumferentially compressive clamping is applied to the split ring during fusion-welding.

9. The method as recited in claim 1, and further comprising placing a metallic insert within the groove, and fusing the outer radial surface of the insert adjacent the fractured ends to effectively interconnect radially outer portions of the outer race ring.

10. The method as recited in claim 7, and further comprising directing a focused beam of charged particles radially inwardly at the insert to fuse and weld the insert and adjacent fractured ends to one another.

11. A method for constructing a bearing, comprising forming a hardened outer race ring with a drilled longitudinal groove disposed adjacent to and partially radially breaking through the outer surface of the ring to form an outwardly facing groove with angularly extending outer edges facing one another across the groove opening, fracturing the outer ring substantially along a radially extending seam at the groove location to provide mating fractured ends of the outer ring, forming an inner race ring and placing the same substantially concentrically within the outer ring, expanding the outer ring at the seam without permanently deforming the same, inserting between said substantially concentrically placed rings a plurality of antifriction elements, contracting the outer ring to abutment of said ends, placing an insert within the groove in abutment with the radially inwardly facing sides of the edges, and welding the edges to reunite the ring and firmly press said mating fractured ends towards one another.

12. The method as recited in claim 11, wherein said welding step comprises directing an energized beam radially inwardly at the insert and the outer edges to fuse and weld the edges to the insert.

13. The method as recited in claim 12, wherein said directing step includes focusing a beam of charged particles generally radially inwardly at the insert and the outer edges to fuse and join the edges of the insert.

14. The method as recited in claim 11, wherein said insert is formed with a longitudinal flat and wherein said insert is placed within the groove with the flat facing radially outwardly.

15. The method as recited in claim 11, and further comprising forming a generally cylindrically shaped insert having a diameter slightly less than the groove diameter and slightly larger than the diameter of the groove after shrinkage caused by the fusion-welding step, placing said insert within the groove, and fusion-welding the insert to the edges to reunite the ring whereby said insert absorbs a portion of a circumferential force produced by the fusion-welding.

16. The method of constructing a bearing comprising an outer ring member having a concave internal raceway surface and inner convex bearing means capacitated to ride said raceway, said method comprising finishing a circumferentially continuous outer ring member to desired hardness and raceway-surface finish, locally fracturing said ring member to define a seam which breaks the circumferential continuity of said ring member, parting said ring member at the seam against the resilience of said ring member and preassembling said inner convex bearing means within said raceway, and returning the parted ends to adjacency at the seam, and fusion-welding the adjacent ends of said ring member at a part of the seam, whereby the split ring of the filled bearing may be united without deleterious effect on the hardened and finished raceway, and uninterrupted raceway support is provided for the bearing under load.

References Cited

UNITED STATES PATENTS

| | | | |
|---|---|---|---|
| 1,498,748 | 6/1924 | Pierce, Jr. | 29—148.4X |
| 2,624,105 | 1/1953 | Virtue | 29—148.4 |
| 2,624,645 | 1/1953 | Virtue | 308—196 |
| 2,648,578 | 8/1953 | Stearns et al. | 29—148.4X |
| 2,657,105 | 10/1953 | Stearns | 29—148.4X |
| 2,702,216 | 2/1955 | Stearns | 29—413X |

THOMAS H. EAGER, Primary Examiner

U.S. Cl. X.R.

29—413, 434; 308—196